United States Patent [19]

Pelzer

[11] Patent Number: 4,957,796

[45] Date of Patent: Sep. 18, 1990

[54] LINING AND COVER FOR AUTOMOBILES

[76] Inventor: Helmut Pelzer, Neue Strasse 5, D-5804 Herdecke-Ende, Fed. Rep. of Germany

[21] Appl. No.: 286,990

[22] Filed: Dec. 20, 1988

[30] Foreign Application Priority Data

Dec. 22, 1987 [DE] Fed. Rep. of Germany ....... 3743509

[51] Int. Cl.$^5$ .............................. B32B 5/18; B32B 7/04
[52] U.S. Cl. ......................................... 428/76; 15/215; 296/97.23; 428/81; 428/122; 428/193; 428/304.4; 428/317.9; 428/358
[58] Field of Search ....................... 15/215; 296/97.23; 428/81, 122, 193, 358, 76, 304.4, 317.9

[56] References Cited

U.S. PATENT DOCUMENTS

| 2,044,407 | 6/1936 | Smith | 428/99 |
| 3,804,699 | 4/1974 | Johnson | 428/78 |
| 4,377,614 | 3/1983 | Alfter et al. | 428/213 |
| 4,721,641 | 1/1988 | Bailey | 428/95 X |

Primary Examiner—Henry F. Epstein
Attorney, Agent, or Firm—Ralf H. Siegemund

[57] ABSTRACT

Foot cover for placement on the floor space of motor vehicles includes a polyurethane form part being provided with a sealing lip extending from edges and edge portions of the form part and is integral therewith; a reinforcing insert extends into and is embedded by the sealing lip.

6 Claims, 1 Drawing Sheet

LINING AND COVER FOR AUTOMOBILES

BACKGROUND OF THE INVENTION

The present invention relates to a floor cover and the lining of the floor area pertaining to the foot space in a motor vehicle, and more particularly the invention relates to a part and component of the kind referred to above for direct installation in a motor vehicle and being comprised of a preformed, polyurethane foam part basically of areal extension.

Linings and covers of the kind to which the invention pertains are generally known. Aside from just being a lining of floor space, they have also to an increasing extent the function of noise abatement and attenuation. The known constructions, however, are disadvantaged by the fact that even though they can be manufactured accurately as far as dimensions are concerned, the location of installation in the vehicle such as the floor is concerned often has tolerance variations to such an extent that the accuracy of manufacturing these lining parts does not avoid that there is lack of sealing and abutment near the edge zone or around perforations and openings or the like. As stated, such parts are supposed to materially contribute to the attenuation of sound and noise, such a formation of gaps is quite undesirable; the sound attenuation and absorption is drastically attenuated by such gaps.

DESCRIPTION OF THE INVENTION

It is an object of the present invention to provide for a novel improved lining and cover for the foot area and floor space in automobiles and being of the kind referred to above which, however, avoids the formation of gaps and, therefore, will not deteriorate any sound attenuation properties they themselves possess.

In accordance with the preferred embodiment of the present invention, it is suggested to provide along any edge of such a foot lining cover or the like as referred to in the object statement, with projecting preferably integrally configured sealing lips made of the same material and which in addition is reinforced by an insert that extends into the form part as well as into the sealing lips and is embedded by the form part materials that form the sealing lips.

These lips made in accordance with the invention project beyond the tolerance variations and will snugly abut along the vehicle floor edges whereever such abutment is necessary, without forming any undesirable gap. It is important that the sealing lip is basically made of the same material such as polyurethane foam as the principal part so as to provide by and in itself certain sound attenuating properties; even though the sealing lips may be thinner than the remainder of the form parts which feature was found not to have any detrimental effect on noise abatement. On the other hand it has to be avoided that the sealing lips, owing to their thinness, can tear. For this reason the insert is provided. On one hand it does not impede the function of the various parts involved but strengthens the lip particularly as far as tearing is concerned. In furtherance of the invention it is suggested to provide the insert as a glass fiber mesh or thermoplastic or jute fiber mesh or webbing. Glass fiber material is preferred but thermoplastic material is close second. One could provide blends of various materials or mixtures of fibers. The insert itself can be a regular mesh, a web, be braided, woven or the like. The insert may be a single layer or single ply element but for strength reasons, when in some cases a strong wear is expected a multilayer configuration may be preferred. The insert extends preferably throughout the form part, in order to avoid problems in terms of undue boundary zones or the like.

The lips are preferably bent either up or down, i.e. away from the general planar configuration of adjacent forms and parts. Such a curved configuration makes possible a better matching of the lining part to the contour of the vehicle's bottom. A curved lip contour is particularly advantageous for ensuring abutment along a curved laterally extending floor and internal wall surfaces in the vehicle. The free end of the sealing lips should of course project beyond the abutment surface generally of the particular lining. Owing to this projecting version of the lips as the cover part abuts the floor of the vehicle, the lip is elastically deformed e.g. back into the plane of the abutment form part surface itself or away whatever the circumstances. This elastic yielding is of course very beneficial for sealing purposes.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 illustrates generally a foot cover, foot mat or floor lining 1 of general areal configuration and being basically comprised of a preshaped polyurethane foam part 1. This foam part 1 is provided along the edges, which may be outer edges as well as edges around internal openings or perforations, with outwardly extending sealing lips 2. These lips of course are made of the same material as and are thus integral with the form part 1 itself i.e. of foam polyurethane. The foam part 1 with sealing lips are made in one and the same working steps so that there are no weak interfaces through manufacturing techniques.

The sealing lips as well as the lower part of the part 1 are reinforced through an insert 3 which has a lateral extension that is larger than the areal lateral extension of the form part 1 itself, owing to the portion of insert 3 that extends to the sealing lips 2. The insert 3 is preferably made of a fibrous material such as glass fiber, thermoplastic fibers or jute fibers; the fibers can be separated and just put next to each other or can be interwoven and formed into a mesh, a braided pattern, a weave or the like. The sealing lips including the insert are curved meaning that they extend at a curvature away from the plane of extension of the form part itself.

Figure 1:
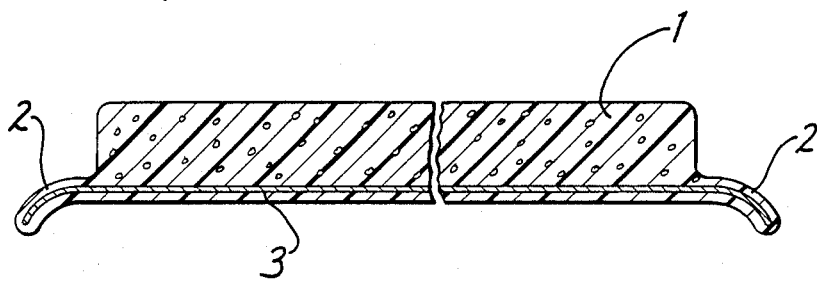
FIG. 1 illustrates a cross section through a first preferred embodiment of the present invention for practicing the best mode thereof.

In the case of FIG. 1 specifically the sealing lips are bent down which means that as the form part is placed onto a floor then owing to the springness and elasticity of the lips themselves they are bent back so that the edge 2a of the lips firmly abuts and matches in contours snug relation to whatever floor part it is situated on.

Figure 2:
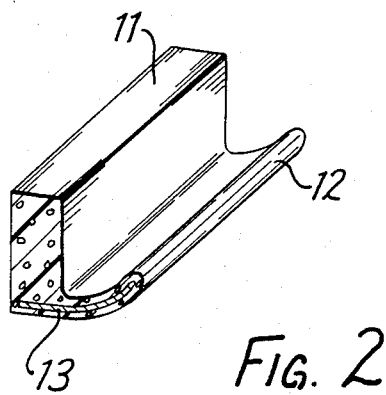
FIG. 2 is similarly a preferred embodiment of a differently configured form part improved in accordance with the best mode of practicing the invention.

The particular form part 11 of FIG. 2 is a different part; it is simply a bar with sealing lip 12 with insert 13, both being curved, in this case, in a different direction as far as the overall extension of the form part 11 is concerned and as compared with the form part 1. As the part is situated on a support surface the sealing lip will be bent up more and will resist thus resiliently though resilient reaction which means that the bar 11 with the sealing lip 12 is more easily adaptable to an upward curved support against which it is sealed.

The invention is not limited to the embodiments described above but all changes and modifications thereof, not constituting departures from the spirit and scope of the invention, are intended to be included.

I claim:

1. Foot cover for placement on the floor space of motor vehicles comprising a form part made of polyurethane foam material being provided with sealing lip means extending from edges and edge portions of said form part being integral therewith and thus made of polyurethane foam: and
   an insert which extends into the sealing lip from the form part for reinforcing the sealing lip and being embedded in the polyurethane foam material.

2. Foot cover as in claim 1, said insert being made of fibrous material including one or more of the following, glass fibers, thermoplastic fibers or jute fibers.

3. Foot cover as in claim 2, said fibers being interwoven, intertwined, meshed, intermeshed or braided.

4. Foot cover as in claim 1, the insert being comprised of a plurality of fibrous layers.

5. Foot cover as in claim 1, said insert extending throughout said form part.

6. Foot cover as in claim 1, said sealing lip being of curved configuration.

* * * * *